(12) United States Patent
Sud

(10) Patent No.: US 8,824,272 B2
(45) Date of Patent: Sep. 2, 2014

(54) RESOLVING CO-CHANNEL INTERFERENCE BETWEEN OVERLAPPING USERS USING RANK SELECTION

(71) Applicant: The Aerospace Corporation, El Segundo, CA (US)

(72) Inventor: Seema Sud, Reston, VA (US)

(73) Assignee: The Aerospace Corporation, El Segundo, CA (US)

( * ) Notice: Subject to any disclaimer, the term of this patent is extended or adjusted under 35 U.S.C. 154(b) by 126 days.

(21) Appl. No.: 13/648,158

(22) Filed: Oct. 9, 2012

(65) Prior Publication Data

US 2014/0098743 A1    Apr. 10, 2014

(51) Int. Cl.
*H04J 11/00* (2006.01)

(52) U.S. Cl.
USPC .......................................... 370/210

(58) Field of Classification Search
CPC combination set(s) only.
See application file for complete search history.

(56) References Cited

U.S. PATENT DOCUMENTS

| | | | |
|---|---|---|---|
| 5,260,968 A | 11/1993 | Gardner et al. | |
| 5,343,404 A * | 8/1994 | Girgis | 702/72 |
| 5,933,421 A | 8/1999 | Alamouti et al. | |
| 5,949,796 A | 9/1999 | Kumar | |
| 5,953,311 A | 9/1999 | Davies et al. | |
| 6,246,698 B1 | 6/2001 | Kumar | |
| 6,560,209 B1 | 5/2003 | Alamouti et al. | |
| 6,853,629 B2 | 2/2005 | Alamouti et al. | |
| 6,882,691 B2 | 4/2005 | Chiodini | |
| 7,046,694 B2 | 5/2006 | Kumar | |
| 7,133,479 B2 | 11/2006 | Lee | |
| 7,450,542 B2 | 11/2008 | Alamouti et al. | |
| 7,872,583 B1 * | 1/2011 | Yushkov et al. | 340/572.1 |
| 7,983,217 B2 | 7/2011 | Alamouti et al. | |
| 8,059,627 B2 | 11/2011 | Hong et al. | |
| 8,170,081 B2 | 5/2012 | Forenza et al. | |
| 2001/0050926 A1 | 12/2001 | Kumar | |
| 2002/0159540 A1 * | 10/2002 | Chiodini | 375/316 |
| 2002/0176519 A1 | 11/2002 | Chiodini et al. | |
| 2004/0208267 A1 | 10/2004 | Lee | |
| 2005/0163257 A1 * | 7/2005 | Keerthi | 375/340 |
| 2008/0130914 A1 * | 6/2008 | Cho | 381/94.1 |
| 2008/0297415 A1 | 12/2008 | Berens et al. | |
| 2009/0046816 A1 | 2/2009 | Hong et al. | |
| 2009/0097597 A1 | 4/2009 | Li et al. | |
| 2009/0180466 A1 | 7/2009 | Soul et al. | |
| 2010/0039233 A1 * | 2/2010 | Niedzwiecki et al. | 340/10.1 |
| 2010/0177851 A1 | 7/2010 | Lin et al. | |
| 2010/0275097 A1 | 10/2010 | Choi et al. | |
| 2010/0316163 A1 | 12/2010 | Forenza et al. | |

(Continued)

OTHER PUBLICATIONS

Blind Carrier Frequency Offset Estimation for OFDM System with Multiple Antennas using Multiple-Invariance Properties, Xiaofei Zhang, Xin Gao, Dayuan Wang, and Dazhuan Xu, Published Online by Springer Science and Business Media, http://wcg.nuaa.edu.cn/papers/Blind%20Carrier%20Frequency%20Offset%20Estimation%20for%20OFDM.pdf (Mar. 27, 2009).

(Continued)

*Primary Examiner* — Jung-Jen Liu
(74) *Attorney, Agent, or Firm* — LeonardPatel PC

(57) ABSTRACT

An improved method for resolving interference between co-channel users is disclosed. A peak in a spectrum generated by a MUSIC algorithm is determined for a signal of interest ("SOI") using a noise subspace. Also, an estimated carrier frequency offset ("CFO") is determined for the SOI based on the determined peak in the spectrum.

18 Claims, 16 Drawing Sheets

(56) References Cited

U.S. PATENT DOCUMENTS

| | | | |
|---|---|---|---|
| 2011/0002371 A1 | 1/2011 | Forenza et al. | |
| 2011/0002410 A1 | 1/2011 | Forenza et al. | |
| 2011/0002411 A1 | 1/2011 | Forenza et al. | |
| 2011/0003606 A1 | 1/2011 | Forenza et al. | |
| 2011/0003607 A1 | 1/2011 | Forenza et al. | |
| 2011/0003608 A1 | 1/2011 | Forenza et al. | |
| 2011/0070840 A1* | 3/2011 | Nielsen et al. | 455/67.11 |
| 2012/0009942 A1* | 1/2012 | Zoubir | 455/456.1 |
| 2012/0084621 A1 | 4/2012 | Hong et al. | |
| 2012/0320730 A1* | 12/2012 | Morelli et al. | 370/210 |

OTHER PUBLICATIONS

Blind Estimation of OFDM Carrier Frequency Offset via Oversampling, Biao Chen and Hao Wang, IEEE Transactions on Signal Processing, vol. 52, No. 7, pp. 2047-2057 (Jul. 2004).

Deterministic Multiuser Carrier-Frequency Offset Estimation for Interleaved OFDMA Uplink, Zhongren Cao, Ufuk Tureli, and Yu-Dong Cao, http://escholarship.ucop.edu/uc/item/2gw1n874?display=a11, Early Unrevised Article Later Published as IEEE Transactions on Communications, vol. 52, No. 9, Sep. 2004 (Sep. 1, 2004).

Performance of Suspace Based Multi-User CFO Estimation for Interleaved OFDMA Uplink, Dusan S. Radovic and Miljko M. Eric, http://www.libsou.com/pdf/01630275.pdf, EUROCON 2005, Serbia & Montenegro, Belgrade, pp. 1602-1605 (Nov. 22-24, 2005).

Spatial Multiuser Access OFDM with Antenna Diversity and Power Control, Joonsuk Kim, John M. Cioffi, Vehicular Technology Conference, IEEE VTS-Fall VTC 2000 52nd, pp. 273-279 (2000).

Subspace Method Based Blind Channel Equalization in OFDM System, P. Sivakumar and M. Rajaram, European Journal of Scientific Research, vol. 61, No. 2, pp. 314-320 (2011).

Wikipedia Multiple Signal Classification Article, http://en.wikipedia.org/wiki/Multiple_signal_classification (last accessed May 7, 2012).

* cited by examiner

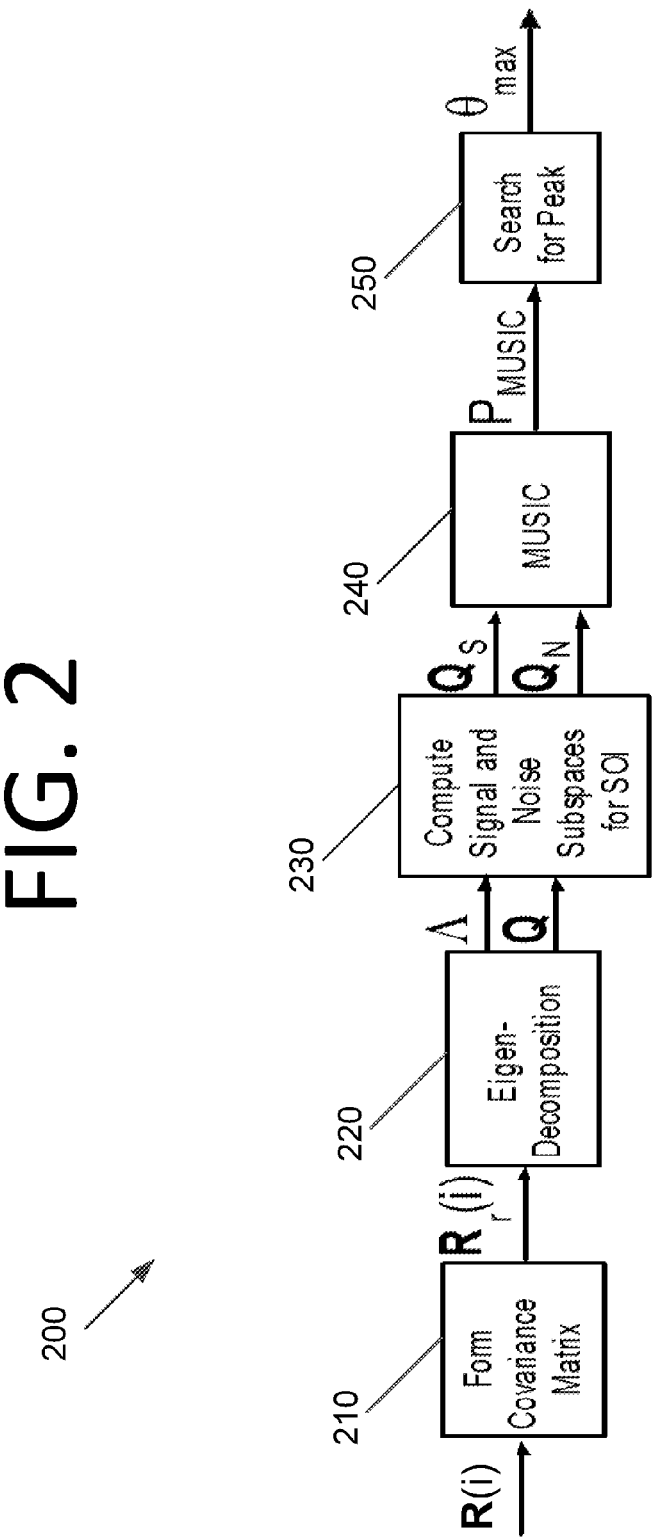

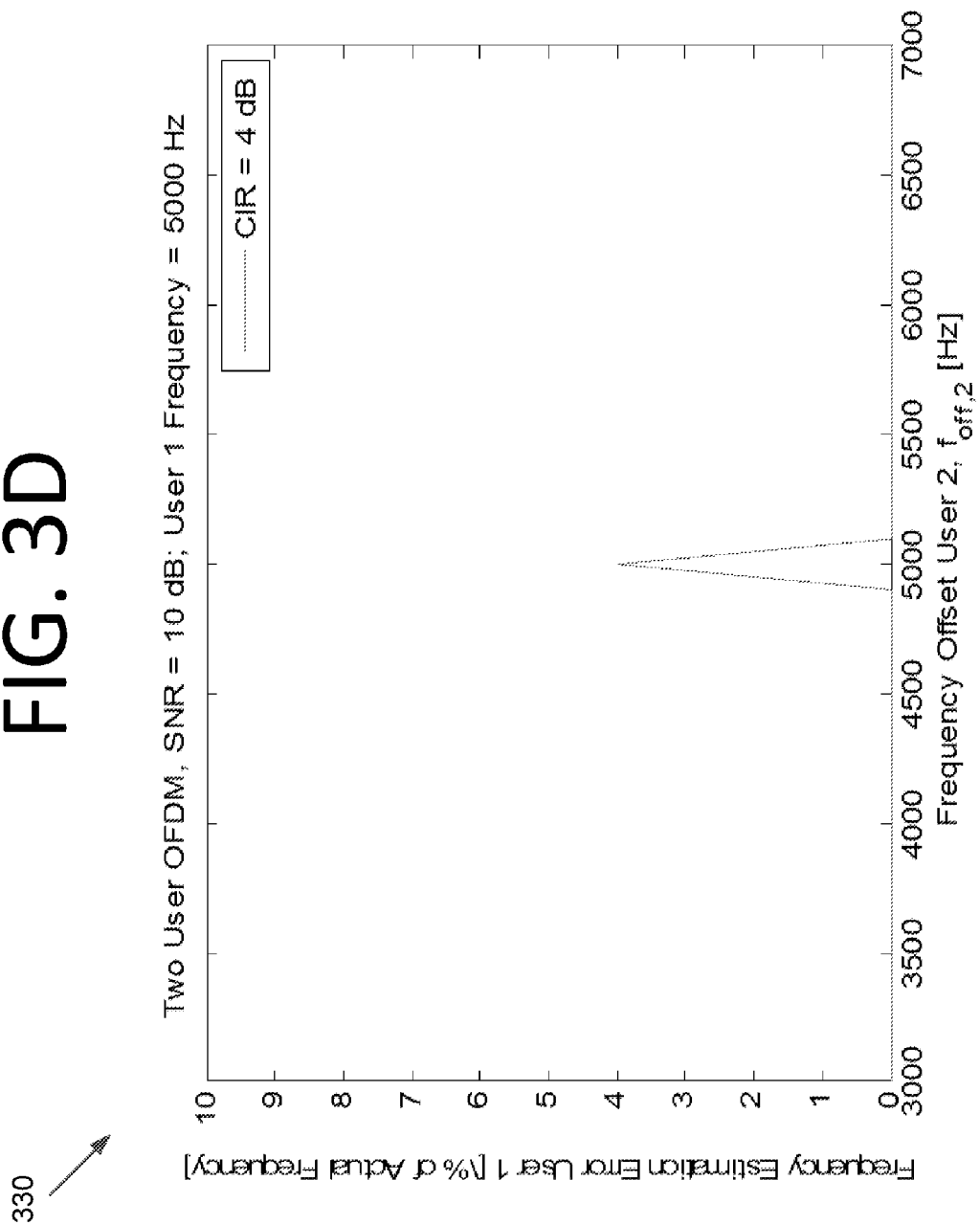

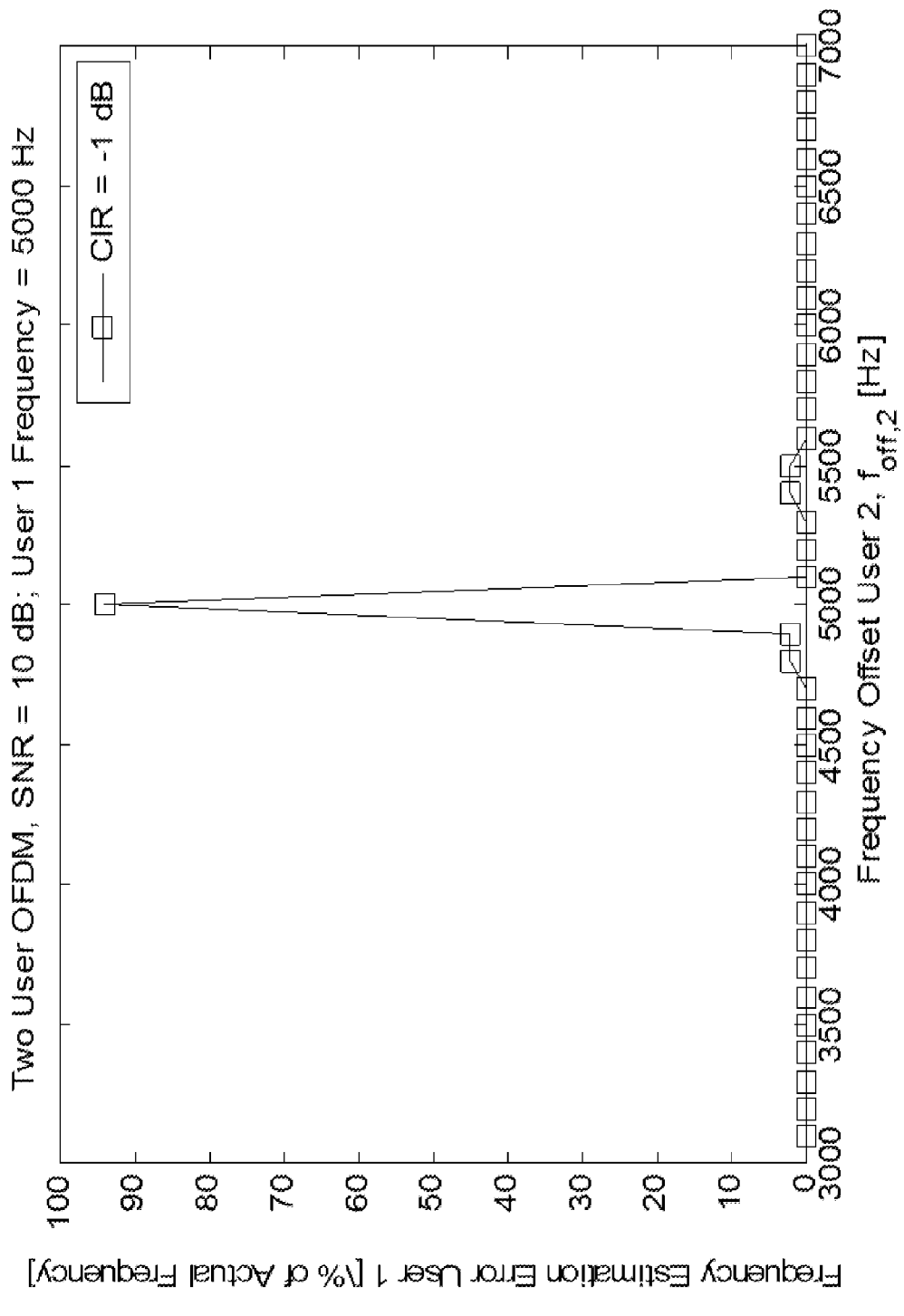

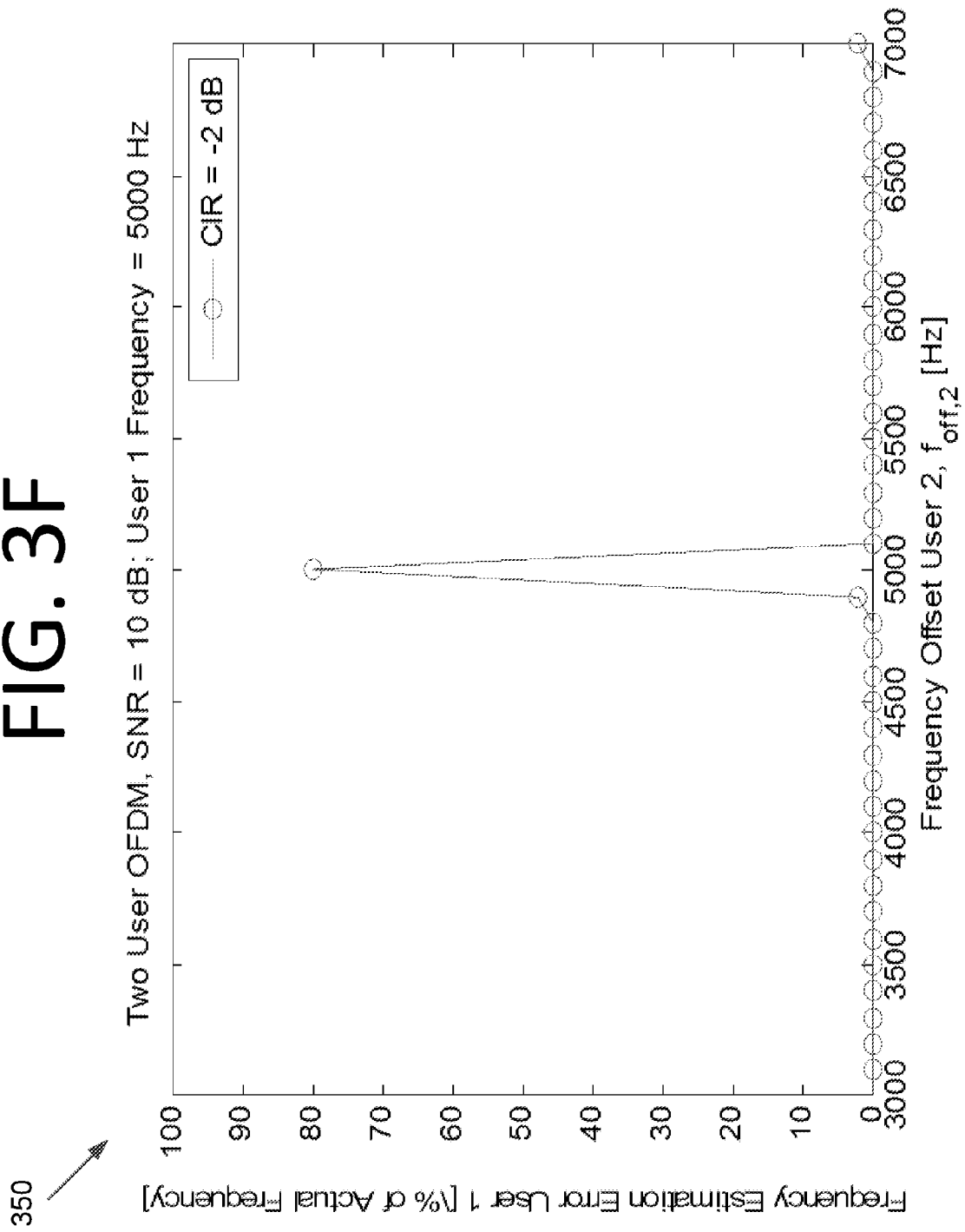

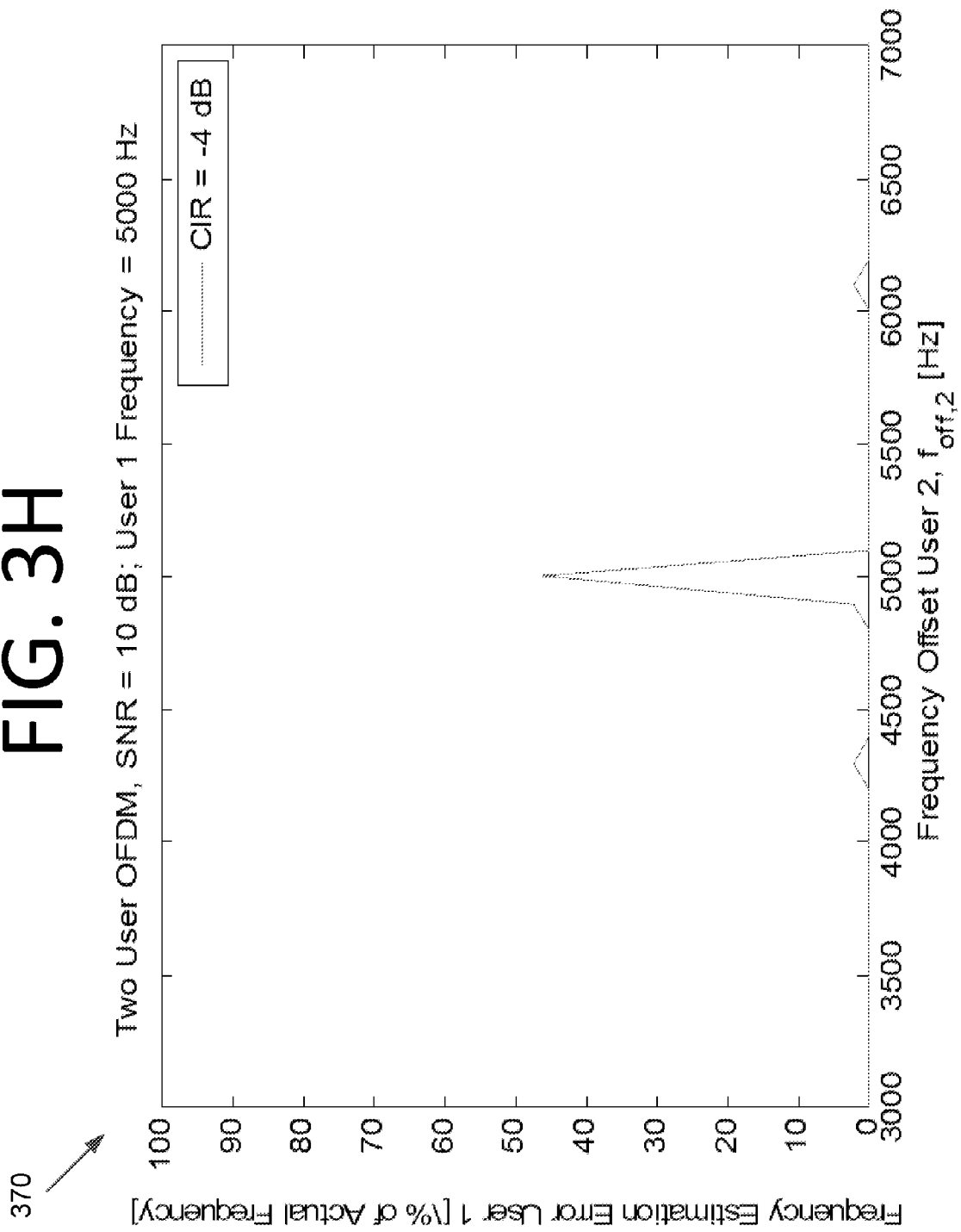

US 8,824,272 B2

RESOLVING CO-CHANNEL INTERFERENCE BETWEEN OVERLAPPING USERS USING RANK SELECTION

FIELD

The present invention generally pertains to resolving co-channel interference, and more specifically, to resolving co-channel interference between overlapping users in a cellular telecommunications network.

BACKGROUND

Cellular systems are evolving toward using Orthogonal Frequency Division Multiplexing ("OFDM"), where the data for one user is modulated across many subcarriers and then modulated onto a single main carrier. Other sub-carriers, called pilots, may contain no underlying data. In practice, data in a pilot is set to all ones or all zeros. Pilots are generally used to help acquire and synchronize a signal. Due to oscillator instabilities, however, the frequency may drift from the intended value, resulting in a Carrier Frequency Offset ("CFO"). In demodulating OFDM signals, the CFO should be accurately estimated for good performance. Typically, if there are multiple users in a cell, the users in the cell each occupy different carrier frequencies, and hence different bands. If the CFO for a given user cannot be estimated accurately, the performance of OFDM systems can degrade significantly.

Co-channel interference in cellular telecommunications systems is a significant problem for signal detection and demodulation on both terrestrial receivers and space-based platforms, such as satellites. Existing methods for CFO estimation based on the Multiple Signal Classification ("MUSIC") algorithm, Kalman filtering, or other techniques such as Maximum Likelihood Sequence Estimation ("MLSE") only apply to a single user in a given frequency band, or to a multi-user system where the multiple users do not overlap in frequency (i.e., they are not co-channel users). Hence, conventional techniques do not address the co-channel interference problem where two different users' signals overlap in time and frequency and both CFOs must be estimated.

In such a case, the users overlap in the same time and in the same frequency band, but with slightly offset carrier frequencies. Typically, in such a scenario, the signal for the lower powered user would be ignored (i.e., dropped). This would force the user to initiate the call again in order to continue the conversation. This co-channel interference scenario is common in real systems, but is not addressed conventionally. Accordingly, a method of effectively handling co-channel interference may be beneficial.

SUMMARY

Certain embodiments of the present invention may be implemented and provide solutions to the problems and needs in the art that have not yet been fully solved by conventional approaches to handling interference. For example, certain embodiments of the present invention use a rank selection approach to a CFO estimation algorithm, such as MUSIC, for separating two overlapping co-channel users in telecommunications systems using technologies such as OFDM. More specifically, some embodiments apply MUSIC to estimate the CFOs of multiple users simultaneously. The performance is accurate for signals that are close in power level, and overlap in time and frequency, but have slightly different CFOs. Moreover, the time delays for the users may also be different (i.e., they may be asynchronous in time).

In one embodiment of the present invention, a computer program embodied on a computer-readable storage medium is configured to cause at least one processor to determine a peak in a first spectrum generated by a MUSIC algorithm for a first signal of interest ("SOI") using a first noise subspace. The computer program is also configured to cause the at least one processor to determine an estimated CFO for the first SOI based on the determined peak in the first spectrum.

In another embodiment of the present invention, a computer-implemented method includes performing, by a computing system, an eigendecomposition of a covariance matrix for a received signal, wherein columns of an eigendecomposition matrix produced by the eigendecomposition are eigenvectors. The computer-implemented method also includes selecting, by the computing system, an eigenvector in the eigendecomposition matrix having a largest eigenvalue as a signal subspace and selecting, by the computing system, the remaining eigenvectors in the eigenvector matrix as a noise subspace. The computer-implemented method further includes computing, by the computing system, a CFO based on the noise subspace using a MUSIC algorithm.

In yet another embodiment of the present invention, an apparatus includes physical memory including computer program instructions and at least one processor configured to execute the computer program instructions. The at least one processor is configured to apply rank selection to a CFO estimation algorithm to estimate a CFO of a user among at least two overlapping co-channel users.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 illustrates a CFO algorithm at the receiver, according to an embodiment of the present invention.

FIG. 3D is a graph illustrating the frequency estimation error for user 1 plotted against the CFO for user 2 with a CIR of 4 dB, according to an embodiment of the present invention.

FIG. 3E is a graph illustrating the frequency estimation error for user 1 plotted against the CFO for user 2 with a CIR of −1 dB, according to an embodiment of the present invention.

FIG. 3F is a graph illustrating the frequency estimation error for user 1 plotted against the CFO for user 2 with a CIR of −2 dB, according to an embodiment of the present invention.

FIG. 3H is a graph illustrating the frequency estimation error for user 1 plotted against the CFO for user 2 with a CIR of −4 dB, according to an embodiment of the present invention.

DETAILED DESCRIPTION OF THE EMBODIMENTS

Some embodiments of the present invention apply rank selection to a CFO estimation algorithm, such as MUSIC, to estimate the CFOs of two overlapping users in a cellular network, such as an OFDM network. In the case of MUSIC, this may be accomplished by separating the signal into its signal and noise subspaces. The key idea in some embodiments is to include the SOI in the signal subspace, as this eliminates the other interfering user(s) from the signal subspace and provides a better frequency estimate. This can be accomplished for a strong or weak user by choosing the signal subspace appropriately.

Specifically, in some embodiments, a covariance matrix is formed from a received block of samples, and an eigendecomposition is performed on the matrix, which generates eigenvalues and eigenvectors. The eigenvector associated with the largest eigenvalue is taken as the signal subspace to estimate the CFO of the strongest user, the eigenvector associated with the second largest eigenvalue is taken as the signal subspace to estimate the CFO of the next strongest user, the $k^{th}$ strongest eigenvector associated with the $k^{th}$ largest eigenvalue is taken as the signal subspace to estimate the CFO of the $k^{th}$ strongest user, etc. The $k^{th}$ strongest eigenvector is referred to as having rank k. For instance, if k=1, the rank is 1, if k=2, the rank is 2, etc. In a practical embodiment, this approach was tested with 0-100% signal overlap in frequency and Carrier-to-Interference Ratios ("CIRs") from −4 to +4 decibels (dB) with excellent CFO estimation accuracy for both strong and weak users. Conventional receivers cannot estimate CFOs of a weak user in the presence of the stronger one.

Signal Model

Figure 1:
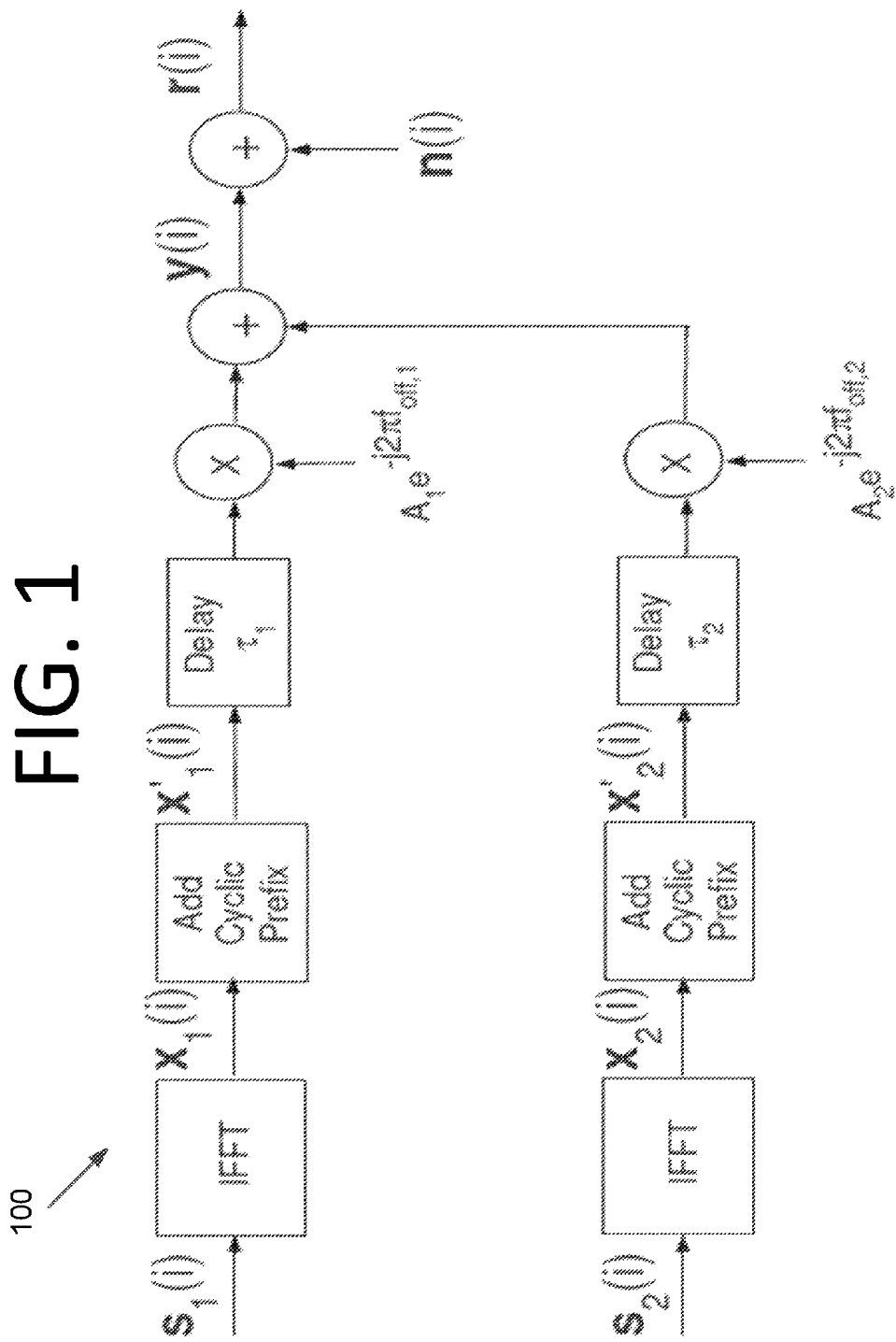
FIG. 1 is a block diagram illustrating a two-user OFDM transmitter.
Figure 3A:
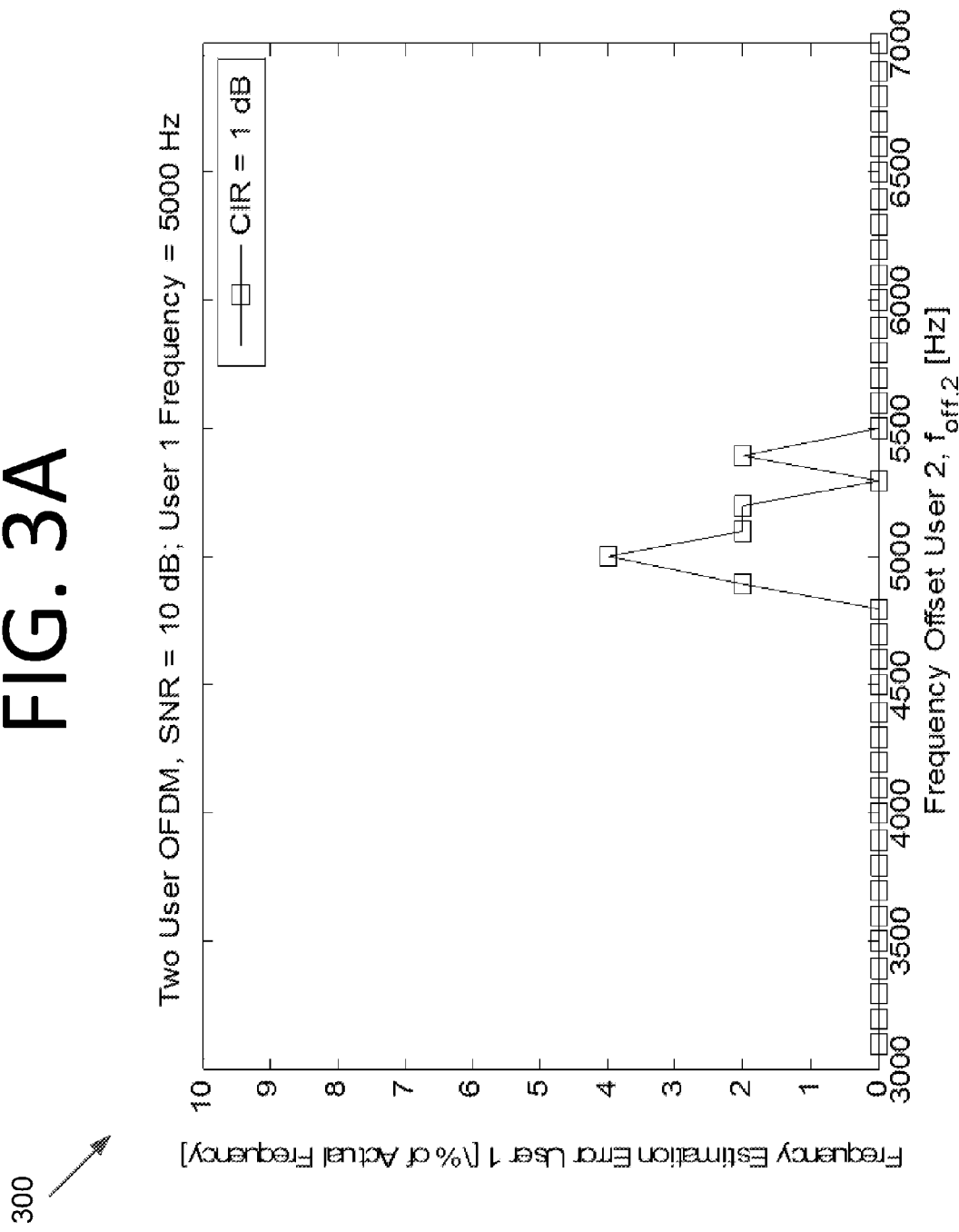
FIG. 3A is a graph illustrating the frequency estimation error for user 1 plotted against the CFO for user 2 with a CIR of 1 decibel (dB), according to an embodiment of the present invention.
Figure 3B:
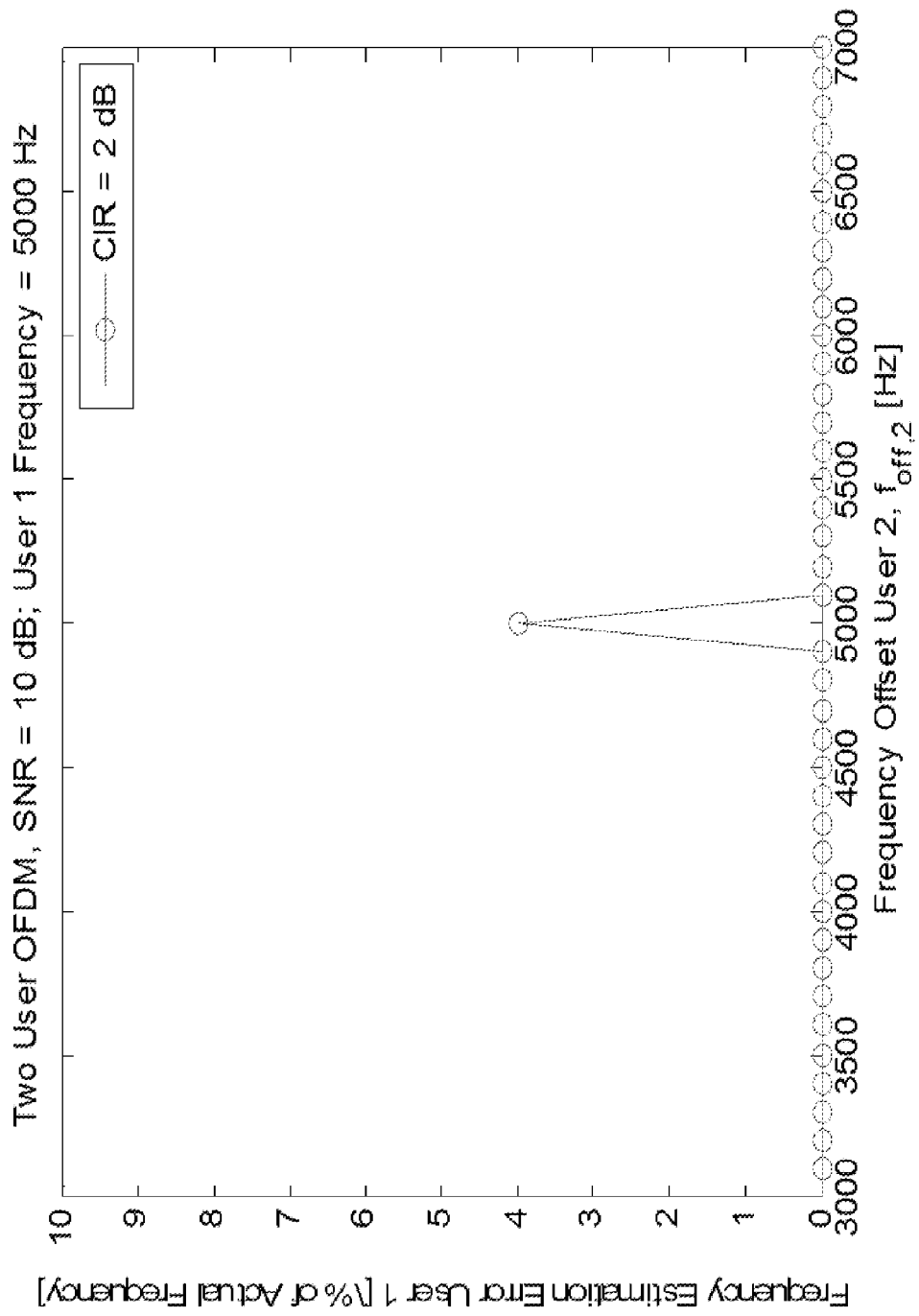
FIG. 3B is a graph illustrating the frequency estimation error for user 1 plotted against the CFO for user 2 with a CIR of 2 dB, according to an embodiment of the present invention.
Figure 3C:
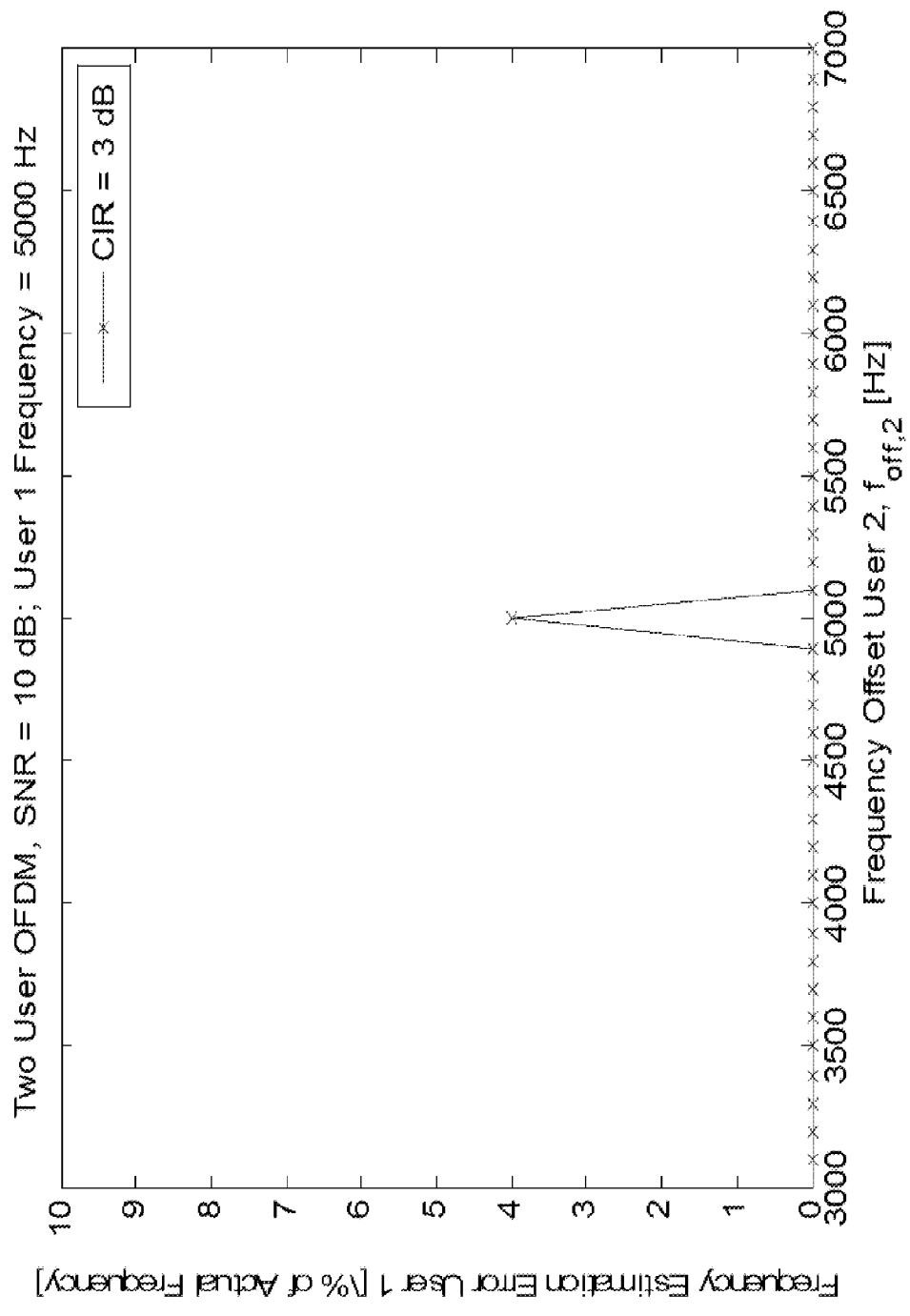
FIG. 3C is a graph illustrating the frequency estimation error for user 1 plotted against the CFO for user 2 with a CIR of 3 dB, according to an embodiment of the present invention.
Figure 3G:
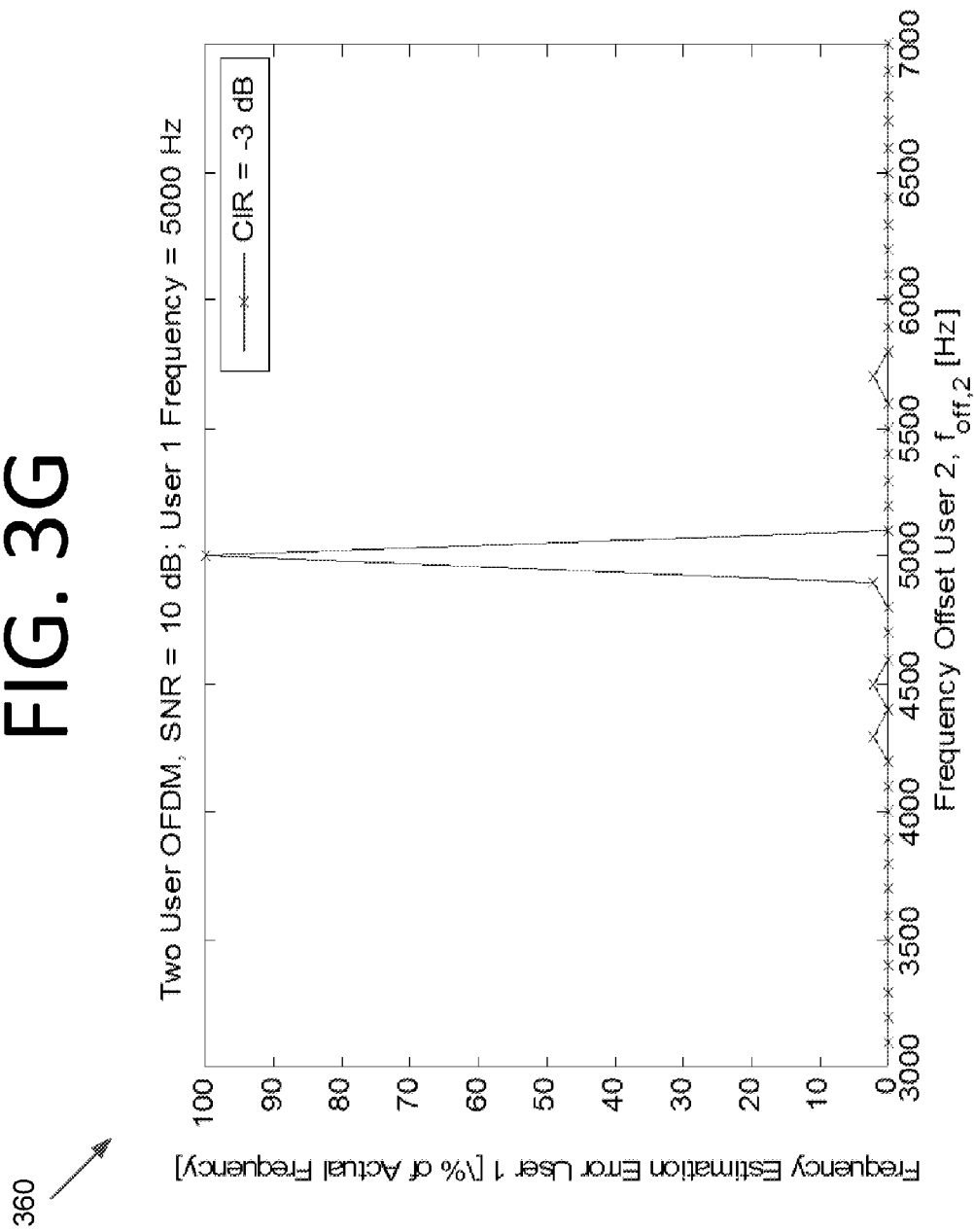
FIG. 3G is a graph illustrating the frequency estimation error for user 1 plotted against the CFO for user 2 with a CIR of −3 dB, according to an embodiment of the present invention.

FIG. 1 is a block diagram illustrating a two-user OFDM transmitter 100. The signals overlap in time and frequency, but with different time and carrier frequency offsets. A block of N OFDM symbols for user k=1 is represented by $s_1(i)$. In this example, it is assumed that the block of symbols is constructed from binary data and Quadrature Phase Shift Keying ("QPSK") modulated. The data is also encoded. Alternatively, in some embodiments, the signal may be a pilot, where no data is used to modulate the carrier.

An Inverse Fast Fourier Transform ("IFFT") operation using an IFFT size of $N_{IFFT}$ is performed on the block of symbols to produce the OFDM signal in the time domain, which is denoted by $x_1(i)$. $s_1(i)$ is referred to as a data symbol and $x_1(i)$ is referred to as an OFDM symbol. In general, $N_{IFFT}$ does not need to be equal to N. In most cases, $N_{IFFT} > N$, which indicates that some of the sub-carriers in the OFDM symbol do not carry any information. In embodiments where pilots are used, sub-carriers containing the pilots generally do not contain any information, having values of all ones or all zeros.

A cyclic prefix of length CP is added to the beginning of the OFDM symbol to protect against multipath, giving a new OFDM symbol $x'_1(i)$ of length $N_{IFFT}+CP$. User 2 is modeled similarly, with data symbol $s_2(0$, OFDM symbol $x_2(i)$, and cyclic prefix padded OFDM symbol $x'_2(i)$. For user 1 and user 2, denoting the amplitudes as $A_1$ and $A_2$, the delays as $\tau_1$ and $\tau_2$, and the CFOs as $f_{off,1}$ and $f_{off,2}$, respectively, the composite signal seen at the receiver prior to the addition of noise is $$y(i) = A_1 x'_1(i-\tau_1) e^{-j2\pi f_{off,1}(0:N_{IFFT}+CP-1)} + A_2 x'_2(i-\tau_2) e^{-j2\pi f_{off,2}(0:N_{IFFT}+CP-1)} \quad (1)$$

In this example, it is assumed without loss of generality that user 1 is the SOI and user 2 is the interferer. Accordingly, $A_1=1$. $A_2$ is set based on a power difference (i.e., a CIR) between user 1 and user 2 by letting $A_2=10^{-CIR/20}$, where the CIR is given in dB. If the CIR is negative, this means that user 1 (i.e., the SOI) is weaker in power than user 2. For the purpose of studying CFO estimation, synchronization with user 1 is assumed in this example such that $\tau_1=0$, but $\tau_2 \neq 0$. $\tau_2$ can take on any value from 0 to $N_{IFFT}+CP-1$ (i.e., the delay can be the length of the OFDM symbol). In Additive White Gaussian Noise ("AWGN"), the received signal is given by $$r(i) = y(i) + n(i) \quad (2)$$

where the amplitudes of the AWGN samples n(i) are set based on the desired Signal-to-Noise Ratio ("SNR") in the received signal.

An Example Implementation

FIG. 2 illustrates a CFO algorithm 200 at the receiver, according to an embodiment of the present invention. The receiver may be a user's cell phone, a base station, a satellite, or any other suitable device. M blocks of data are collected from the received signal given by Eq. (2) above. An $(N_{IFFT}+CP) \times M$ matrix of the received data is formed, denoted R(i), such that each block forms a column of R(i). The covariance matrix of the received data R(i) is then an $(N_{IFFT}+CP) \times (N_{IFFT}+CP)$ matrix formed at 210 as $$R_r(i) = R(i) R^T(i) \quad (3)$$

Conceptually, the idea is to pull the signal of interest out of the matrix $R_r(i)$ to obtain its frequency estimate. This is done in this embodiment by performing an eigendecomposition on the covariance matrix $R_r(i)$ at 220. The eigendecomposition yields eigenvectors Q and corresponding eigenvalues Λ, per the equation $$[Q, \Lambda] = \text{eig}(R_r(i)) \quad (4)$$

When the eigenvalues are sorted in descending order, the first two columns of Q, called eigenvectors, correspond to the two largest eigenvalues and provide the signal information for the two user scenario. The first column of Q gives the stronger signal and the second column of Q gives the weaker signal, depending on which user is the SOI.

The signal and noise subspaces are then computed at 230. The selected column is the signal subspace $Q_S$. The remaining columns form the noise subspace, $Q_N$, which is used in the MUSIC algorithm to compute the CFO. $Q_N$ includes the other user's eigenvector.

Next, the MUSIC power spectrum $P_{MUSIC}$ is computed at 240 by first generating steering vectors over the entire frequency space:

$$a = e^{-j2\pi\theta(0:N_{IFFT}+CP-1)} \tag{5}$$

where $\theta=[-0.5:\Delta_\theta:0.5]^T$, and the step size is $\Delta_\theta$. Matrix a has dimensions $(N_{IFFT}+CP)\times \text{length}(\theta)$. The steering vectors represent energy in a particular direction. This assumes that the signal has already been converted to its nominal baseband frequency, and the bandwidth is normalized to a range of ±0.5. If, for example, the baseband bandwidth is ±10 kHz (i.e., a total bandwidth of 20 kHz), 0.5 corresponds to 10 kHz, so the final frequency estimate would be scaled accordingly. The selected step size $\Delta_\theta$ should be small enough to obtain a sufficient frequency resolution to minimize error, but not so small that the processing time increases beyond what can be handled by the processing power of the system for practical implementations.

In the examples below, $\Delta_\theta=0.005$, giving a total of 200 frequency bins across the bandwidth. The MUSIC power spectrum may then be computed as follows:

for $l = 1$:length($\theta$)

$$P_{MUSIC}(l) = a(:,l)^H a(:,l) / \|a(:,l)^H Q_N^H Q_N^H a(:,l)\|^2 \tag{6}$$

end for loop

The peak in the MUSIC spectrum $P_{MUSIC,max}$ is searched for at 250, and the corresponding value of $\theta=\theta_{max}$ provides an estimate of the CFO. For the purpose of testing the algorithm performance, the estimated CFO may be compared with the true CFO and the error may be computed as a percentage of the true CFO.

This approach may be generalized and the $k^{th}$ eigenvector may be chosen as the signal to extract the $k^{th}$ highest power user. As such, this approach can easily be extended to a case with K=3 or more users, but performance degrades as the number of users increases. At some point, the higher powered interference generally becomes great enough that the CFO estimation accuracy for lower powered users would suffer. However, such scenarios where there are a large number of co-channel users should be rare.

Simulation Examples

In graphs 300, 310, 320, 330, 340, 350, 360, and 370 of FIGS. 3A-H, the frequency estimation error for user 1 in percentage of the actual frequency is plotted against the CFO for user 2 in Hz with a CIR of 1, 2, 3, 4, −1, −2, −3, and −4 dB, respectively. The CFO of user 1 is set to $f_{off,1}=5$ kHz over an assumed total baseband bandwidth of 20 kHz (i.e., from −10 to 10 kHz). For FIGS. 3A-H, N=64, $N_{IFFT}=1024$, and CP=0. The bandwidth of user 1 and user 2 is approximately 1.2 kHz. The CFO of user 2 varies from $f_{off,2}=3$ to 7 kHz in steps of 100 Hz. The choice of range of $f_{off,2}$ covers the range from 0 to 100% frequency overlap between the two signals. The delay of user 2 is arbitrarily set to $\tau_2=375$ samples (equal to 0.29 of an OFDM symbol since each OFDM symbol is of length $N_{IFFT}+CP=1024$ samples). $f_{off,2}$ is plotted against the measured frequency error of user 1 as a percentage of the actual frequency of $f_{off,1}=5$ kHz. FIGS. 3A-H show the results at a SNR of 10 dB.

As is apparent from FIGS. 3A-H, the CFO estimates are accurate unless the two signals have exactly the same frequency, since in such a case, some embodiments may not be able to separate the signals. The accuracy improves as the CIR increases since the increasing power difference between the two users allows the MUSIC algorithm to separate the users more accurately. In general, the CFO estimates are better when the CIR is positive than when the CIR is negative since the user of interest has a higher power than the interferer.

Advantages

A significant advantage of many embodiments of the present invention is that CFO estimation can be applied to the co-channel case (i.e., where there are two or more overlapping users). No conventional approaches for performing CFO estimation in the co-channel case exist. Estimates can be provided for both a stronger user and a weaker user in parallel, and the weaker signal can be extracted and demodulated in a co-channel environment, which was not previously possible. Per the above, this technique can also be applied to the case where there are more than two users (i.e., K=3 or more). Better estimates can also be obtained for the stronger signal in the presence of the weaker interferer.

Figure 4:
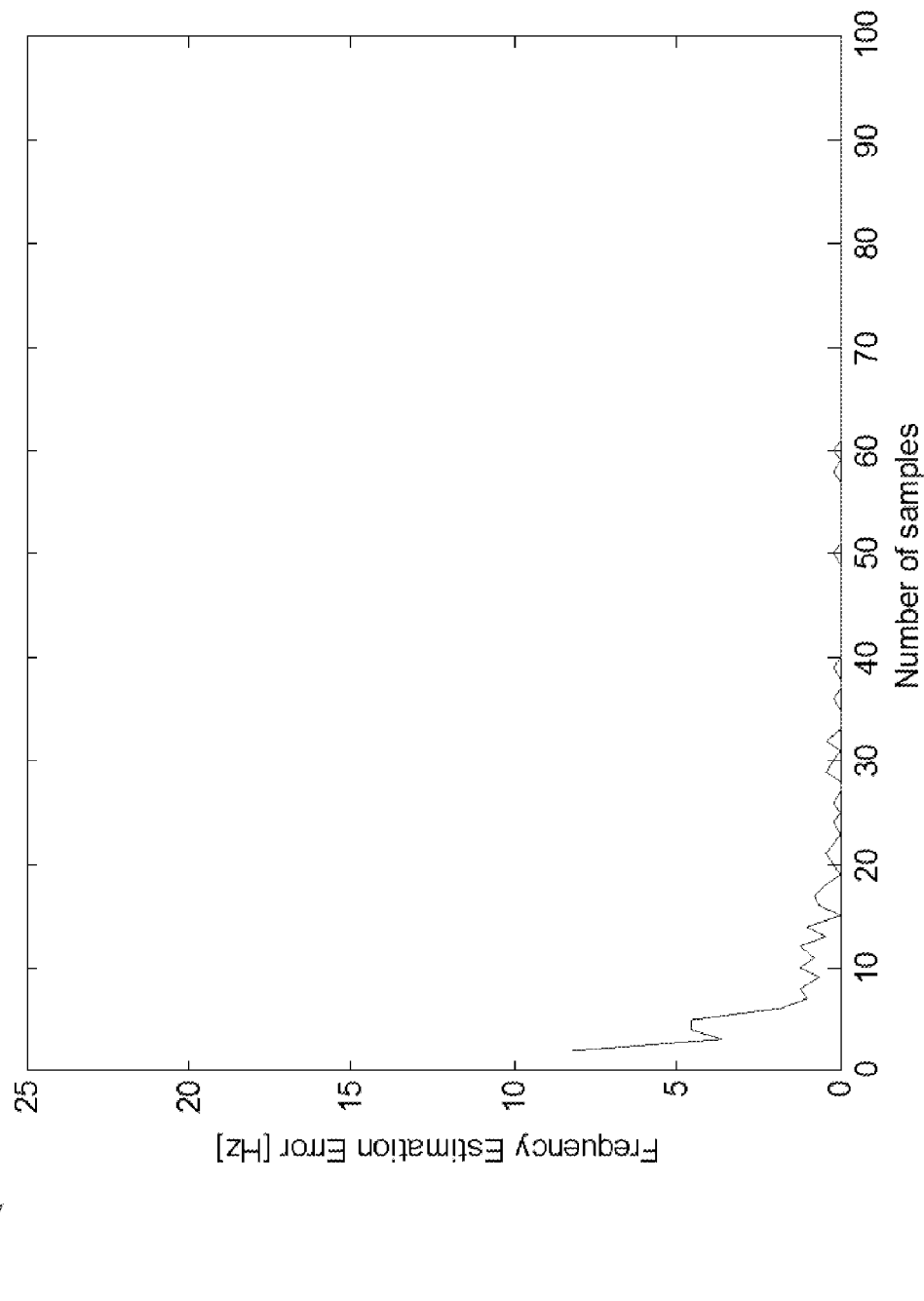
FIG. 4 is a graph illustrating frequency estimation error of a MUSIC-based approach to CFO estimation, according to an embodiment of the present invention.

Another advantage is that the MUSIC-based approach of some embodiments can be shown to converge to provide the CFO estimate with fewer samples, and more accurately, than with conventional approaches for the single user case. Consider the graph of the MUSIC-based approach illustrated in FIG. 4 compared to a conventional Kalman filter approach illustrated in FIG. 5. The comparison is for a single user since two-user Kalman filtering does not conventionally exist. Since this is a single user application, $A_2=0$ in this signal model. The MUSIC algorithm is applied as discussed above with respect to FIG. 2, using the first column of Q to obtain the CFO estimate of user 1.

Figure 5:
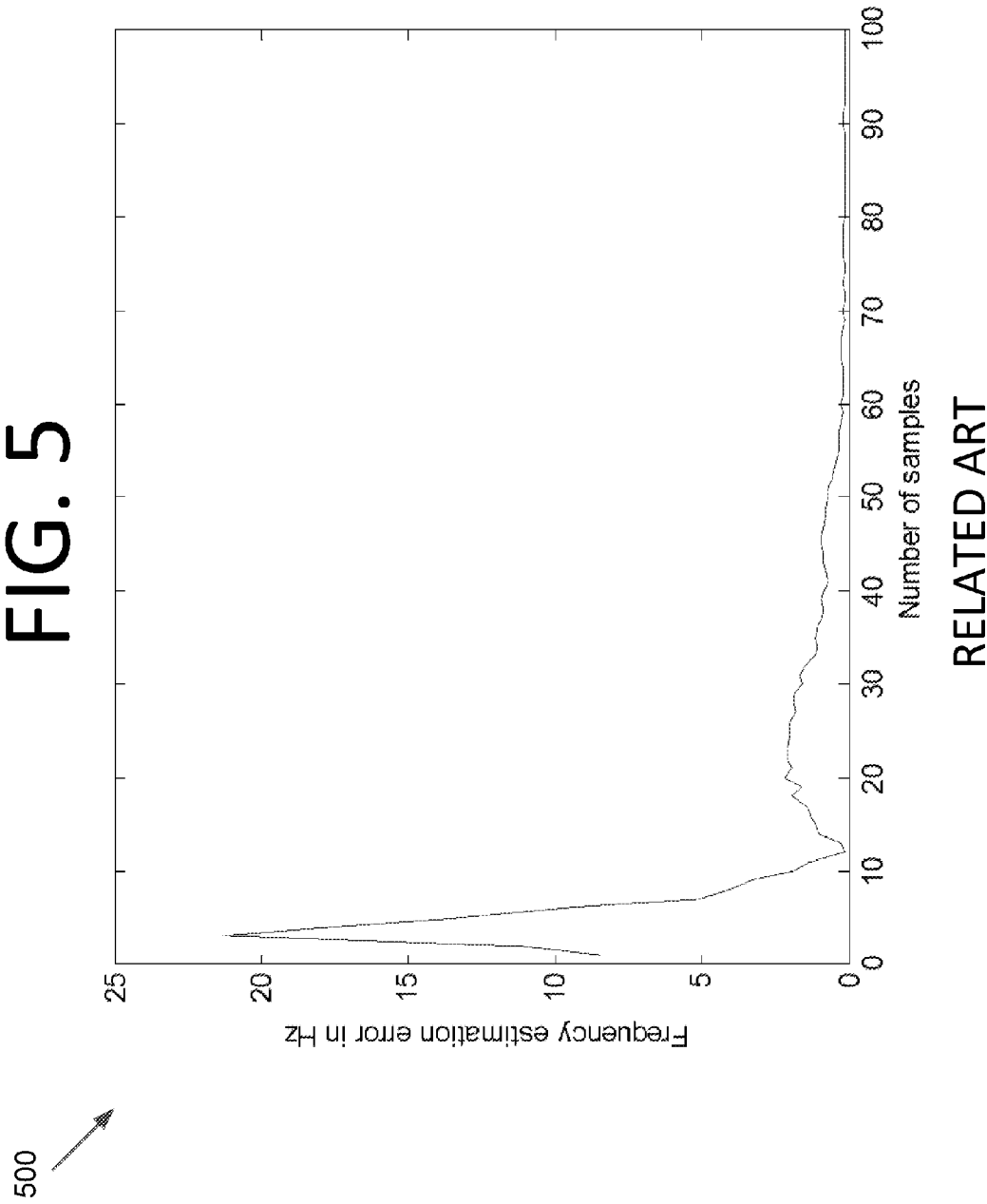
FIG. 5 is a graph illustrating frequency estimation error of a Kalman filter approach to CFO estimation.

In this example, a sinusoidal carrier is assumed at baseband, modulated with a signal having a bandwidth of 200 Hz, and sampled at a sampling rate of $f_S=400$ Hz. The frequency error at the carrier is taken to be 55 Hz. Noise is added to the received signal to obtain a SNR of 7 dB. In FIG. 5, an actual OFDM signal is not simulated. Accordingly, the IFFT and FFT operations are eliminated for the comparison.

The simulation includes generating bits of all ones, which are Binary Phase Shift Keying ("BPSK") modulated onto a carrier of frequency 55 Hz and passed over an AWGN channel. The Kalman filtering operates in an iterative manner on individual samples, while MUSIC operates on a block of bits. Thus, for instance, when the number of samples is shown as 100, this means that the Kalman filter operates iteratively on all bits from i=1, 2, . . . , 100. However, the MUSIC algorithm operates on a block of 100 samples.

As can be seen from FIGS. 4 and 5, the MUSIC algorithm converges faster than the Kalman filter algorithm. In FIG. 5, the Kalman filter takes about 60 samples to approach a 0.3 Hz frequency estimation error, whereas MUSIC requires only 40 samples. Also, the initial error estimate obtained via MUSIC (8 Hz) is smaller than the initial error estimate obtained with Kalman filtering (10-20 Hz). Further, while both algorithms do converge, MUSIC converges to give a lower error (0 Hz) than the Kalman filter (0.3 Hz).

It is noted that the MUSIC-based approach performs an eigendecomposition to compute the signal and noise components, which may be relatively computationally intensive. However, this is mitigated by the fact that fewer samples are required to compute the solution. While the comparison between FIGS. 4 and 5 is a single user scenario, a multi-user scenario comparison cannot be offered since no conventional methods provide any performance comparison for the weaker signal in an interference scenario having two users or more.

Potential Applications for Commercial Use

There is a long list of commercial systems that employ OFDM technology. These systems include, but are not limited to, 4G Long-Term Evolution ("LTE"), High-speed short-range technology known as the Ultra-Wideband ("UWB") standard set by the WiMedia Alliance, the IEEE 802.11a/g/n standards, Wideband Wireless Metro Area Network ("MAN") technology ("WiMAX"), Wireless Local Area networks ("LANs") such as Wi-Fi and HIPERLAN, and Asymmetric Digital Subscriber Line ("ASDL") and Very High Bit Rate ("VDSL") used for Internet access, which use a form of OFDM known as Discrete Multi-Tone ("DMT"). Each of these technologies is further discussed below.

4G LTE

Cellular communications systems, such as those using the 4G LTE standard employing OFDM, suffer from Co-Channel Interference ("CCI"). The issue is that users near the edge of a cell have low SNRs because their signal is weak and there is severe inter-cell interference from other users. The result is that user throughput and quality of service ("QoS") suffers compared to users closer to the center of the cell. There is a pressing need for interference mitigation in the presence of this CCI. Many techniques, such as interference cancellation, are computationally complex. Other techniques require complicated beamforming algorithms. Multiple Input Multiple Output ("MIMO") OFDM provides capacity improvements over conventional (i.e., single antenna) OFDM due to diversity and array gain. However, MIMO OFDM systems also suffer from numerous CCI issues that result from channel induced multipath, time variations, and co-antenna interference. One of the main sources of interference is the multiple access interference (e.g., from other users in the system). MIMO OFDM interference suppression solutions are typically processing-intensive, requiring iterative space-time interference cancellation algorithms.

The effects of CCI include dropped calls occurring with a high probability in certain locations, such as driving down a particular road. In certain locations, service may be sporadic. In addition to the United States, whose 4G LTE service providers include AT&T® and Verizon®, LTE systems are deployed in Europe, Asia, Africa, Australia, South America, as well as Canada in North America.

UWB/802.11/WiMAX

Co-channel interference in the case of UWB, IEEE 802.11, and WiMAX occurs because often times these systems are overlaid in the same frequency bands. Hence, it is inevitable that the very wide UWB systems would interfere with the narrower IEEE 802.11 and WiMAX systems. Some embodiments of the present invention would help separate the users to enable demodulation of these different signals that overlap in the same frequency band.

Wi-Fi

Wi-Fi signals suffer from CCI in a manner similar to the 4G LTE. In Wi-Fi systems, users typically transmit over small ranges wirelessly over a computer network. An example is a high speed Internet connection provided in hotel rooms. A Wi-Fi device is sometimes called a Wireless LAN ("WLAN") device. Many commercial devices currently use Wi-Fi. These include laptops, video games, smartphones, and digital tablets. Such devices can connect to the Internet via an access point known commonly as a "hotspot." Typical ranges are approximately 20-60 feet for many hotspots.

As most people who have used Wi-Fi devices have seen, connections may be interrupted or Internet speeds may be reduced due to interference from other Wi-Fi devices in the surrounding area. If the interference is significant, it can prevent a new Wi-Fi device from accessing the network in the worst case, or simply decrease the SNR of devices already on the network, resulting in a loss of signal quality or reduced transmission rates. In high density areas, this becomes a significant problem. Some embodiments of the present invention would allow two or more interfering Wi-Fi users to be separated, thereby increasing the network's capacity (i.e., the number of users that the network can serve).

ASDL and VSDL

CCI in ASDL and VSDL occurs as a result of crosstalk among DSL service providers. It is a significant issue that can cause reduction of QoS of the DSL, similar to that of 4G LTE systems. Some embodiments of the present invention provide a simple way to deal with CCI in a single antenna or MIMO configuration. In the MIMO configuration, the algorithm can be applied to each receiver antenna individually to estimate CFOs, as discussed above for the single user case.

Figure 6:
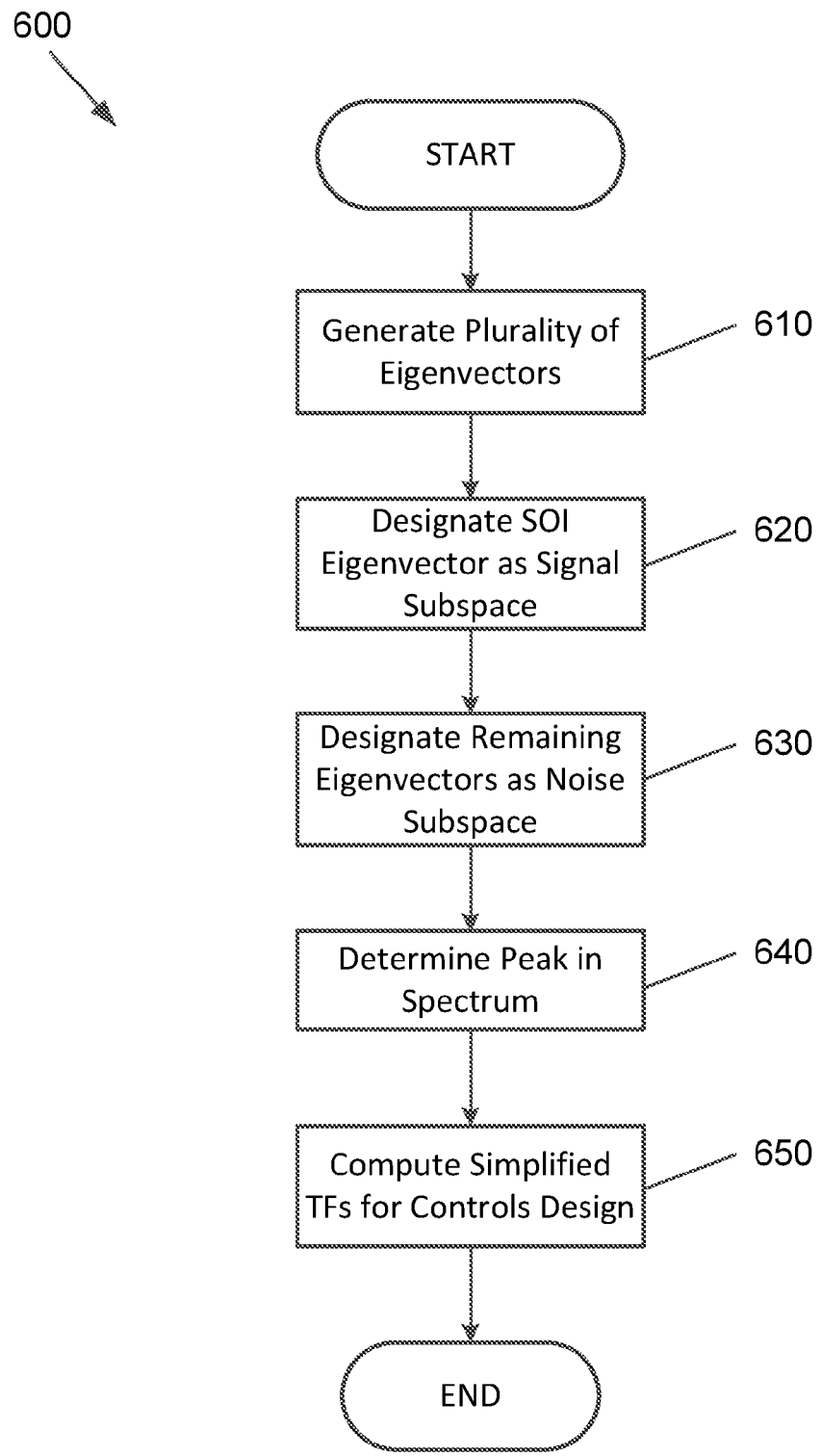
FIG. 6 is a flowchart illustrating a method of resolving co-channel interference, according to an embodiment of the present invention.

FIG. 6 is a flowchart 600 illustrating a method of resolving co-channel interference, according to an embodiment of the present invention. The method begins with generating a plurality of eigenvectors by forming an eigendecomposition of a covariance matrix representing a received signal at 610. An eigenvector of the plurality of eigenvectors associated with the first SOI is designated as the signal subspace at 620. The eigenvector with the highest eigenvalue represents a user of a plurality of co-channel users having the strongest signal strength. The remaining eigenvectors of the plurality of eigenvectors are designated as the noise subspace at 630.

A peak in a spectrum generated by the MUSIC algorithm is determined at 640 using the noise subspace. Next, at 650 an estimated CFO for the SOI is determined based on the peak in the spectrum. This method may be repeated for any other desired co-channel users by taking the eigenvector with the second highest eigenvalue as the SOI representing the second strongest user, taking the eigenvector with the third highest eigenvalue as the signal representing the third strongest user, etc. In other words, the signal subspace for the kth strongest signal is the column of the eigendecomposition of the covariance matrix (i.e., the eigenvector) having the kth highest eigenvalue.

Figure 7:
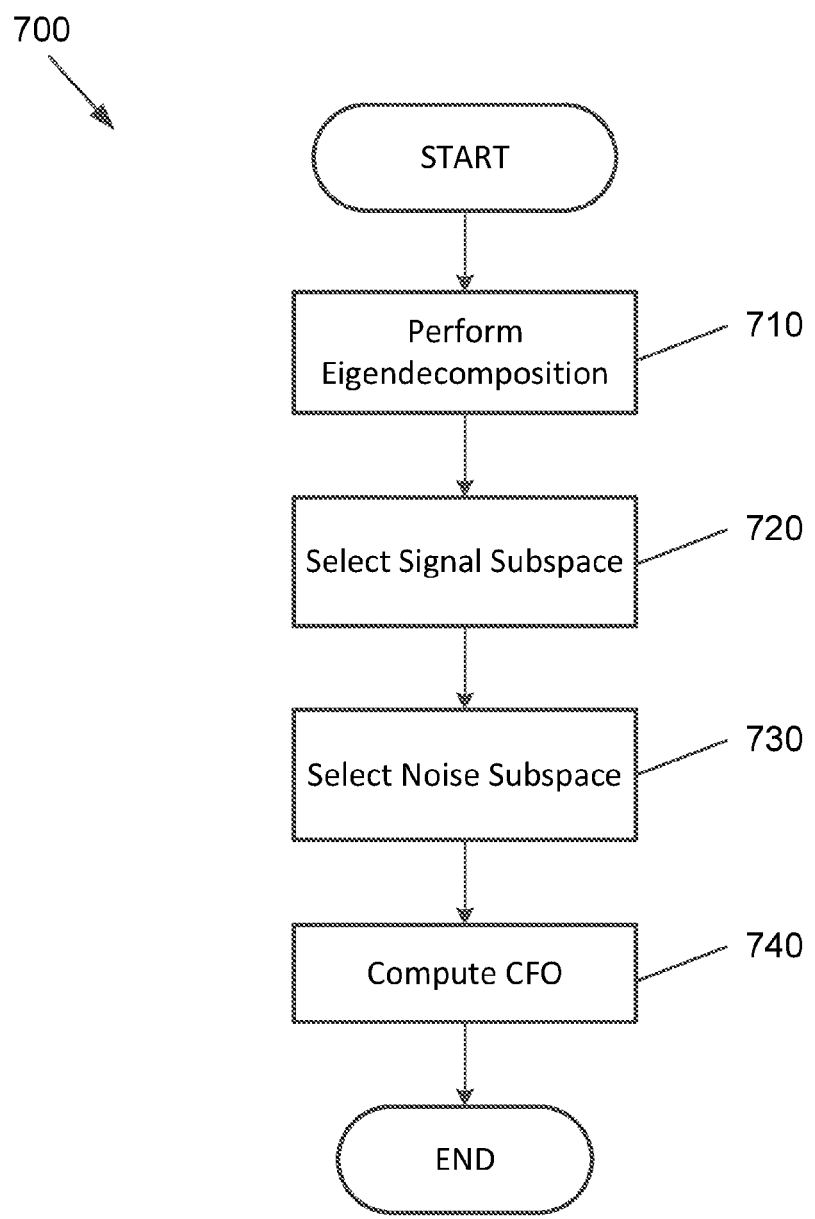
FIG. 7 is a flowchart illustrating a method of resolving co-channel interference, according to an embodiment of the present invention.

FIG. 7 is a flowchart 700 illustrating a method of resolving co-channel interference, according to an embodiment of the present invention. The method begins with performing an eigendecomposition of a covariance matrix for a received signal at 710. Columns of an eigendecomposition matrix produced by the eigendecomposition are eigenvectors. Next, an eigenvector in the eigendecomposition matrix that has the largest eigenvalue is selected as the signal subspace at 720. The remaining eigenvectors in the eigenvector matrix are selected as the noise subspace at 730.

Thereafter, a CFO is computed at 740 based on the noise subspace using the MUSIC algorithm. The eigenvector of the signal subspace represents a user of a plurality of co-channel users having the strongest signal strength in some embodiments. A signal subspace for a kth strongest signal includes a column of the eigendecomposition of the covariance matrix having the kth highest eigenvalue. As such, the method may be repeated accordingly for the kth strongest user.

Figure 8:
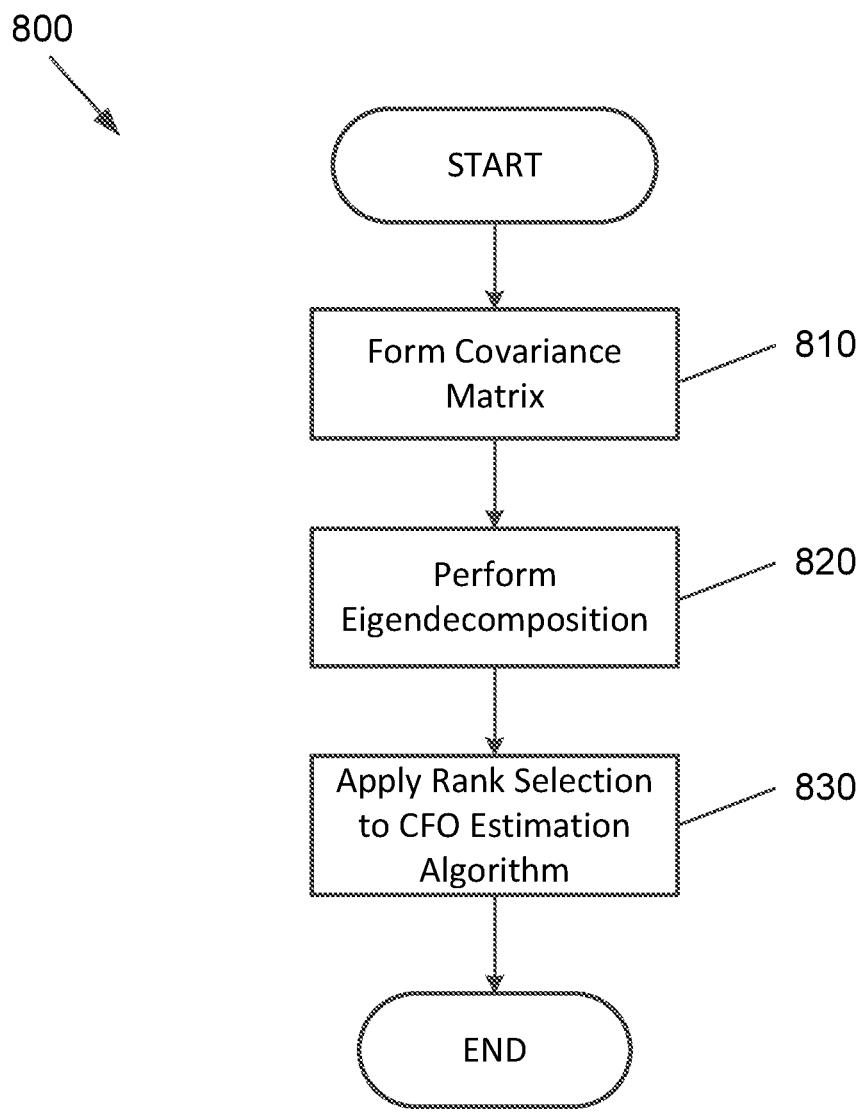
FIG. 8 is a flowchart illustrating a method of resolving co-channel interference, according to an embodiment of the present invention.

FIG. 8 is a flowchart 800 illustrating a method of resolving co-channel interference, according to an embodiment of the present invention. The method begins with forming a covariance matrix from a received block of samples at 810. Next, an eigendecomposition is performed on the covariance matrix to generate eigenvalues and eigenvectors at 820. Thereafter, rank selection is applied to a CFO estimation algorithm to estimate a CFO of a user among at least two overlapping co-channel users at 830.

In some embodiments, only a signal of interest in a signal subspace associated with the user is included to eliminate interfering users from the signal subspace. In certain embodiments, for K co-channel users, an eigenvector having a kth largest eigenvalue is taken as a signal subspace to estimate a CFO of the user with the kth strongest signal strength. In some embodiments, a CIR may be between −4 and +4 dB.

The method of FIG. 8 may be performed by a cell phone, a base station, a satellite, or any other suitable device. A communications network associated with the device may use OFDM, for example. The CFO determination algorithm may be the MUSIC algorithm.

Figure 9:
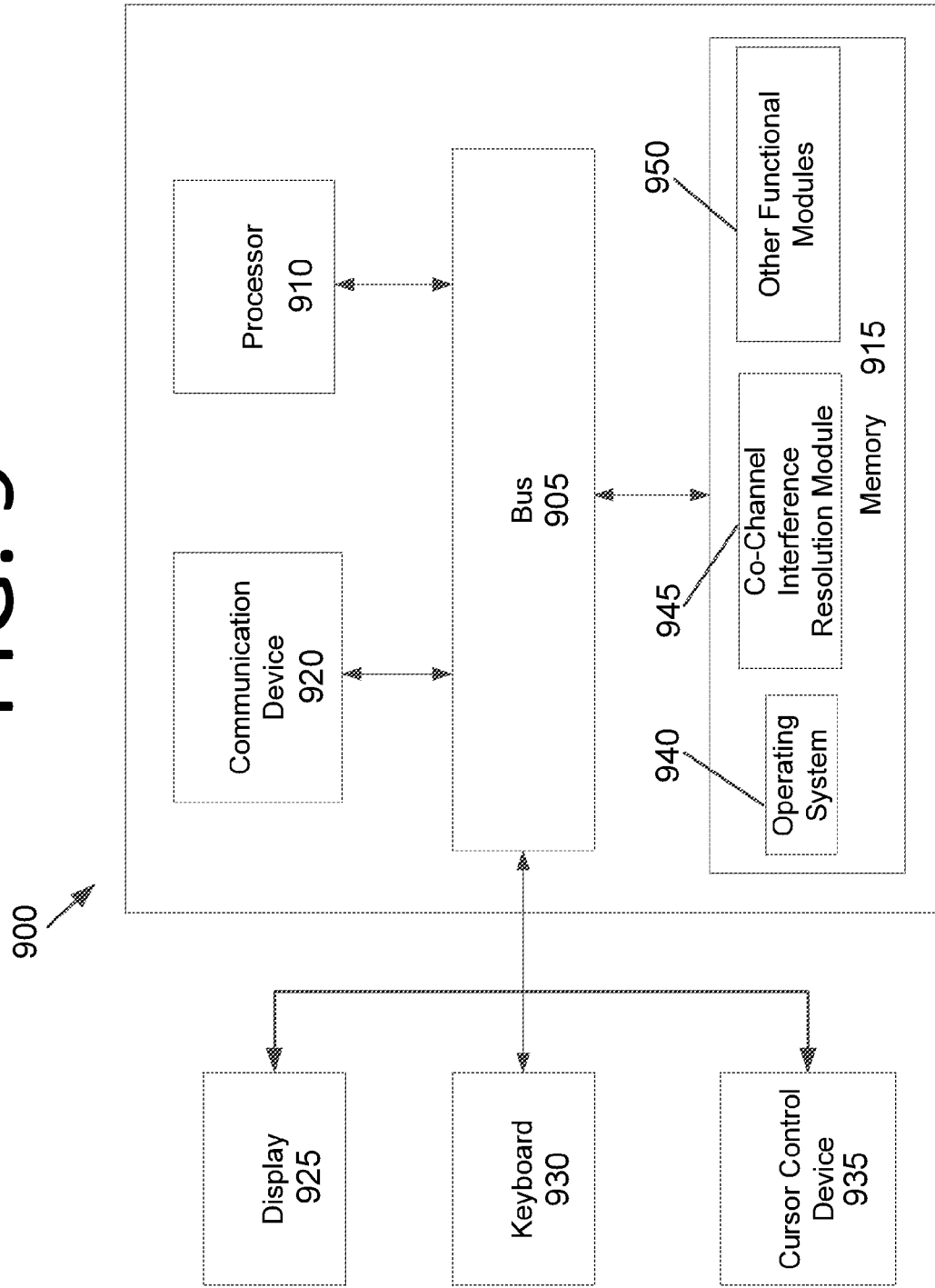
FIG. 9 illustrates a computing system, according to an embodiment of the present invention.

FIG. 9 illustrates a computing system, according to an embodiment of the present invention. System 900 includes a bus 905 or other communication mechanism for communicating information, and a processor 910 coupled to bus 905 for processing information. Processor 910 may be any type of general or specific purpose processor, including a central processing unit (CPU) or application specific integrated circuit (ASIC). System 900 further includes a memory 915 for storing information and instructions to be executed by processor 910. Memory 915 can be comprised of any combination of random access memory ("RAM"), read only memory ("ROM"), flash memory, cache, static storage such as a magnetic or optical disk, or any other types of non-transitory computer-readable media or combinations thereof. Additionally, system 900 includes a communication device 920, such as a transceiver, to wirelessly provide access to a telecommunications network.

Non-transitory computer-readable media may be any available media that can be accessed by processor 910 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor 910 is further coupled via bus 905 to a display 925, such as a Liquid Crystal Display ("LCD"), for displaying information to a user. A keyboard 930 and a cursor control device 935, such as a computer mouse, are further coupled to bus 905 to enable a user to interface with system 900. However, in certain embodiments such as those for mobile computing implementations, a physical keyboard and mouse may not be present, and the user may interact with the device solely through display 925 and/or a touchpad (not shown). Any type and combination of input devices may be used as a matter of design choice.

In one embodiment, memory 915 stores software modules that provide functionality when executed by processor 910. The modules include an operating system 940 for system 900. The modules further include a co-channel interference resolution module 945 that is configured to resolve co-channel interference using the methods described therein and variants thereof. System 900 may include one or more additional functional modules 950 that include additional functionality One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory ("RAM"), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIGS. 6-8 may be performed by a computer program, encoding instructions for the nonlinear adaptive processor to perform at least the methods described in FIGS. 6-8, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 6-8, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program embodied on a non-transitory computer-readable storage medium, the computer program configured to cause at least one processor to:
perform an eigendecomposition of a covariance matrix for a received signal, wherein columns of an eigendecomposition matrix produced by the eigendecomposition are eigenvectors; and
for each of the k largest eigenvalues, where k is an integer representing a number of co-channel users and the k co-channel users are ordered from strongest to weakest signal strength,
select an eigenvector in the eigendecompositionmatrix having a $k^{th}$ largest eigenvalue as a signal subspace for the $k^{th}$ user,
select the remaining eigenvectors in the eigenvector matrix as a noise subspace, and
compute a carrier frequency offset based on the noise subspace for the $k^{th}$ user using a MUSIC algorithm.

2. The computer program of claim 1, wherein at least one sub-carrier comprises a pilot.

3. A computer-implemented method, comprising:
performing, by the computing system, an eigendecomposition of a covariance matrix for a received signal, wherein columns of an eigendecomposition matrix produced by the eigendecomposition are eigenvectors; and
for each of the k largest eigenvalues, where k is an integer representing a number of co-channel users and the k co-channel users are ordered from strongest to weakest signal strength,
selecting, by the computing system, an eigenvector in the eigendecomposition matrix having a $k^{th}$ largest eigenvalue as a signal subspace for the $k^{th}$ user,
selecting, by the computing system, the remaining eigenvectors in the eigenvector matrix as a noise subspace, and
computing, by the computing system, a carrier frequency offset based on the noise subspace for the $k^{th}$ user using a MUSIC algorithm.

4. The computer-implemented method of claim 3, wherein a signal subspace for the $k^{th}$ strongest signal comprises a column of the eigendecomposition of the covariance matrix having the $k^{th}$ highest eigenvalue.

5. The computer-implemented method of claim 3, wherein at least one sub-carrier comprises a pilot.

6. An apparatus, comprising:
physical memory comprising computer program instructions; and
at least one processor configured to execute the computer program instructions, the at least one processor configured to:
perform an eigendecomposition of a covariance matrix for a received signal, wherein columns of an eigendecomposition matrix produced by the eigendecomposition are eigenvectors, and
for each of the k largest eigenvalues, where k is an integer representing a number of co-channel users and the k co-channel users are ordered from strongest to weakest signal strength,
select an eigenvector in the eigendecomposition matrix having a $k^{th}$ largest eigenvalue as a signal subspace for the $k^{th}$ user,
select the remaining eigenvectors in the eigenvector matrix as a noise subspace, and
compute a carrier frequency offset based on the noise subspace for the $k^{th}$ user using a MUSIC algorithm.

7. The apparatus of claim 6, wherein the at least one processor is further configured to:
include only a signal of interest in a signal subspace associated with the user to eliminate interfering users from the signal subspace.

8. The apparatus of claim 6, wherein the at least one processor is further configured to:
form the covariance matrix from a received block of samples.

9. The apparatus of claim 6, wherein a Carrier-to-Interference Ratio is between −4 and +4 decibels.

10. The apparatus of claim 6, wherein the apparatus comprises a cell phone, a base station, or a satellite.

11. The apparatus of claim 6, wherein a communications network associated with the apparatus uses Orthogonal Frequency Division Multiplexing.

12. The apparatus of claim 6, wherein at least one sub-carrier comprises a pilot.

13. The computer program of claim 1, wherein a signal subspace for the $k^{th}$ strongest signal comprises a column of the eigendecomposition of the covariance matrix having the $k^{th}$ highest eigenvalue.

14. The computer program of claim 1, wherein the computer program is further configured to cause the at least one processor to include only a signal of interest in a signal subspace associated with the user to eliminate interfering users from the signal subspace.

15. The computer program of claim 1, wherein the computer program is further configured to cause the at least one processor to form the covariance matrix from a received block of samples.

16. The computer-implemented method of claim 3, further comprising:
    including, by the computing system, only a signal of interest in a signal subspace associated with the user to eliminate interfering users from the signal subspace.

17. The computer-implemented method of claim 3, further comprising:
    forming, by the computing system, the covariance matrix from a received block of samples.

18. The apparatus of claim 6, wherein a signal subspace for the $k^{th}$ strongest signal comprises a column of the eigendecomposition of the covariance matrix having the $k^{th}$ highest eigenvalue.

* * * * *